United States Patent Office 3,839,453
Patented Oct. 1, 1974

3,839,453
NOVEL BICYCLOALKANE DERIVATIVES
Ulrich Eder and Rudolf Wiechert, Berlin, Germany, assignors to Schering Aktiengesellschaft, Berlin and Bergkamen, Germany
No Drawing. Filed June 9, 1972, Ser. No. 261,217
Claims priority, application Germany, June 11, 1971,
P 21 30 052.7
Int. Cl. C07c 41/10
U.S. Cl. 260—586 R          11 Claims

ABSTRACT OF THE DISCLOSURE

Novel bicycloalkene derivatives of the formula

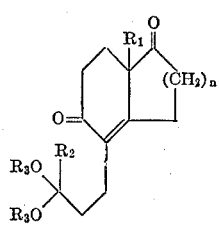

wherein $R_1$, $R_2$, and $R_3$ are each alkyl of 1–6 carbon atoms, and $n$ is 1 or 2, are valuable intermediates in the synthesis of steroids.

BACKGROUND OF THE INVENTION

Field of the Invention

This invention relates to new bicycloalkane ketone derivatives and to methods for their preparation and use.

Description of the Prior Art

The total synthesis of pharmacologically valuable steroids has become increasingly important in recent years, as illustrated by U.S. Pats. 3,555,096 and 3,637,770 to Gordon Hughes and Hershell Smith. R. Boucort et al. have described a stereospecific total synthesis of 19-norprogesterone from an optically active tricyclic alcohol in Bull. Soc. Chim. Fr. 1963, 1923. Bowers et al., in J. Am. Chem. Soc. 84:3204 (1962) have described the reduction and cyclization of a triketone to form 19-norprogesterone.

The total synthesis of complex steroid molecules is complicated and expensive using currently available starting materials and intermediates. Furthermore, many of these compounds are capable of being efficiently converted into only a limited number of final products due to lack of specificity in many of the reactions which they undergo.

OBJECTS OF THE INVENTION

Accordingly, it is an object of this invention to provide new bicycloalkane derivatives.
Another object of this invention is to provide a process for preparing bicycloalkane derivatives.
A further object of this invention is to provide a process for the selective side chain ketralization of triketones.
Upon further study of the specification and appended claims, further objects and advantages of this invention will become apparent to those skilled in the art.

SUMMARY OF THE INVENTION

In accordance with this invention, novel bicycloalkane derivatives of Formula I

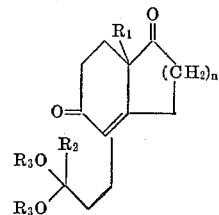

wherein $R_1$, $R_2$, and $R_3$ are each alkyl of 1–6 carbon atoms, and $n$ is 1 or 2, are prepared by ketalizing a compound of Formula II

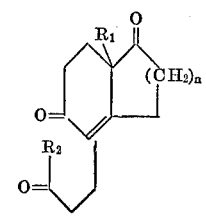

wherein $R_1$, $A_2$, $R_3$, and $n$ have the above-indicated values, with a lower alkyl alcohol.

DETAILED DISCUSSION

The residues $R_1$, $R_2$, and $R_3$ in the above formulae are preferably alkyl of 1–4 carbon atoms, e.g., methyl, ethyl, propyl, or butyl. Especially preferred compounds of Formula I include those in which:

(a) $R_1$ is methyl or ethyl; and/or
(b) $R_2$ is methyl; and/or
(c) $R_3$ is methyl and ethyl.

The starting compounds of Formula II used in the process of this invention can be synthesized in the following manner:

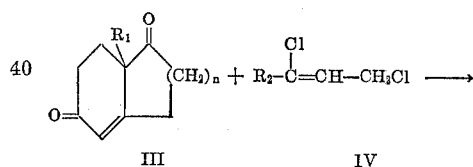

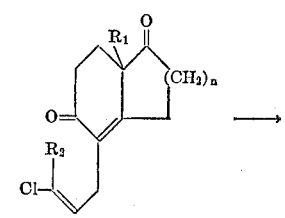

In this formula scheme, $R_1$, $R_2$, and $n$ have the above-indicated values.

Preferably, alkyl alcohols of 1–4 carbon atoms are employed to ketalize the compounds of Formula II. Suitable alcohols include but are not limited to methanol, ethanol, n-propanol, isopropanol, n-butanol, isobutanol and 2-butanol.

The compounds of Formula II are preferably ketalized by reacting them with the alcohols in the presence of a catalytic amount of a ketalization catalyst, preferably an acidic catalyst.

Suitable catalytic amounts of ketalization catalysts will vary with the particular catalyst and reactants, but generally range from 1 to 200 millimoles, preferably 10 to 50 millimoles of catalyst per mole of reactants. Suitable acidic ketalization catalysts include but are not limited to mineral acids, e.g., hydrochloric acid, sulfuric acid, or perchloric acid; sulfonic acids, e.g., methanesulfonic acid, benzenesulfonic acid, or p-toluenesulfonic acid; Lewis acids, e.g., boron trifluoride; or phenols, e.g., p-nitrophenol or 2,4-dinitrophenol.

The ketalization is especially successful if a waterbinding agent is additionally added to the reaction mixture. Suitable water-binding agents are known in the art and include but are not limited to anhydrous sodium sulfate, anhydrous sulfuric acid, anhydrous magnesium sulfate, or anhydrous calcium sulfate.

Particularly suitable water-binding agents for the process of this invention are dialkyl ketals or orthoformic acid esters of the alcohols utilized in the ketalization reaction, e.g., the mono-, di-, and trialkyl esters of orthoformic acid in which the alkyl group as 1–6 carbon atoms, particularly the orthoformic acid trialkyl esters, and especially the trimethyl and triethyl esters.

The ketalization is preferably conducted at a reaction temperature of between $-20°$ C. and $+80°$ C.

Surprisingly, during the ketalization of a compound of Formula II, only the keto group on the side chain is ketalized, whereas the keto groups present at the bicyclic ring are not attacked.

The compounds of Formula I which can be prepared in accordance with the process of this invention are valuable chemical intermediates. They are particularly suitable for use in the production of pharmacologically valuable steroids by total synthesis, e.g., in the preparation of 19-nor-testosterone in a manner analogous to the preparation of 19-norprogesterone from 5,20-dioxo-des-A-19-nor-*progn*-9-ene.

For example, the 7aβ - alkyl - 4 - (3',3'-dialkoxybutyl)-5,6,7,7a - tetrahydroindan - 1,5 - diones of Formula I can be cyclized by heating in benzene with the addition of 0.01 mol of malonic acid to form the corresponding 3 - methyl - 6α - alkyl - 3 - alkoxy - 2,3,5,6,6a,8 - hexahydrocyclopenta - [f][1] - benzopyran - 7[1H] - ones; the latter can be reduced, by treatment with lithium aluminum hydride, to the corresponding 3 - methyl - 6aα-alkyl-3 - alkoxy - 2,3,5,6,6a,8 - hexahydrocyclopenta - [f][1]-benzopyran - 7 - [1H]α - ols. The 3 - methyl - 6aα - alkyl-3 - alkoxy - 2,3,5,6,6a,8 - hexahydrocyclopenta - [f][1]-benzopyran - 7 [1H]α - ols can be hydrogenated, e.g., in ethyl acetate with palladium, animal charcoal and hydrogen, to the corresponding 3 - methyl - 6aα-alkyl-3-alkoxy-2,3,5,6,6a,8,9,9aβ - octahydrocyclopenta - [f][1] - benzopyran - 7 - [1H]α-ols which, by heating with hydrochloric acid in dioxane, form the corresponding des - A - 17β-hydroxy-13-alkyl-9-gonen-5-ones.

The thus-formed des - A - 17β - hydroxy - 13 - alkyl-9-gonen-5-ones can be readily converted in a conventional manner into pharmacologically valuable steroids, e.g., estrone, estradiol, 18-methylestradiol, equilenin, testosterone, 18 - methyltestosterone, 17α - ethinyl - 19 - nor-testosterone, or 17α-ethinyl-18-methyl-19-nor-testosterone.

By reacting compounds of Formula I wherein n is 2 in the same manner, the corresponding D-homo steroids are obtained.

By reactin compounds of Formula I, wherein R is a alkyl group other than methyl in the same manner the corresponding 17β - hydroxy - 10,13 - dialkyl-des-A-9-gonen-5-ones are obtained which can be converted to physiologically active retro steroids by the method described in J. Org. Chem. *34*, 1969, 107 and 1457 and in the U.S. patent application No. 3,591,607.

Illustrative methods for converting the compounds of this invention into pharmacologically valuable steroids are described in our copending application Ser. No. 261,216, filed June 9, 1972.

Without further elaboration, it is believed that one skilled in the art can, using the preceding description, utilize the present invention to its fullest extent. The following preferred specific ambodimentes are, therefore, to be construed as merely illustrative, and not limitative of the remainder of the disclosure in any way whatsoever.

EXAMPLE 1

1.2 moles of potassium tert.-butylate is suspended in 1 liter of absolute dimethoxyethane, and the mixture is cooled to 0° C. under an argon atmosphere. The mixture is then admixed with a solution of 1 mole of compound III ($R_1$=methyl or ethyl; $n$=1) in 1 liter of absolute dimethoxyethane. The resultant mixture is agitated for 20 minutes at 0° C. and then mixed with 1.25 moles of compound IV ($R_2$=methyl).

The reaction mixture is agitated for 16 hours at 0° C., and then poured into ice water. The thus-formed product of Formula V is extracted with methylene chloride and purified by chromatography over a silica gel column.

One mole of compound V is dissolved in 1 liter of methylene chloride, the solution is cooled to $-10°$ C., and 530 ml. of concentrated sulfuric acid cooled to 0° C. is added dropwise thereto under agitation.

The reaction mixture is then stirred for another 20 minutes and poured into ice water. The thus-formed compound of Formula II is extracted with ethyl acetate and purified by chromatography over a silica gel column and/or by recrystallization, and used as the starting material in the following examples.

EXAMPLE 2

20 g. of (±)-7aβ-methyl-4-(3'-oxobutyl)-5,6,7,7a-tetrahydroindan-1,5-dione (m.p. 92–94° C. from diisopropyl ether) is dissolved in 200 ml. of methanol and 20 ml. of the trimethyl ester of orthoformic acid, mixed with 2.8 ml. of a 0.5% methanolic p-toluenesulfonic acid solution, and allowed to stand for 45 minutes at room temperature Then, the reaction mixture is poured into 1 l. of ice-cold saturated sodium bicarbonate solution, and the reaction product is extracted with ether. The ether phase is washed and concentrated. The thus-obtained crude product is recrystallized from ether, resulting in 20.5 g. of (±) - 7aβ - methyl - 4 - (3',3' - dimethoxybutyl) - 5,6,7,7a-tetrahydroindan-1,5-dione, m.p. 97–100° C.

EXAMPLE 3

Under the same conditions as employed in Example 1, 15 g. of (+)-7aβ-methyl-4-(3'-oxobutyl)-5,6,7,7a-tetrahydroindan-1,5-dione (m.p. 72–73.5° C.; $[\alpha]_D^{21}$=+249°) is reacted with methanol, trimethyl orthoformate, and p-toluenesulfonic acid, thus obtaining 15.1 g. of (+)-7aβ-methyl - 4 - (3',3' - dimethoxybutyl) - 5,6,7,7a - tetrahydroindan-1,5-dione, m.p. 114–123° C. (decomposition). $[\alpha]_D^{21}$=+212°.

EXAMPLE 4

Under the conditions of Example 1, 5 g. of (+)-7aβ-ethyl - 4 - (3' - oxobutyl) - 5,6,7,7a-tetrahydroindan-1,5-dione (colorless oil, b.p. 127–130° C./0.1 torr [mm. Hg]; $[\alpha]_D^{21}$=+174°) is reacted with methanol, trimethyl orthoformate, and p-toluenesulfonic acid, thus producing 4.9 g. (+)-7aβ-ethyl-4-(3',3'-dimethoxybutyl)-5,6,7,7a-tetrahydroindan-1,5-dione, m.p. 88–91° C.

$[\alpha]_D^{21}$=+161°.

EXAMPLE 5

5 g. of (±)-7aβ-methyl-4-(3'-oxobutyl)-5,6,7,7a-tetrahydroindan-1,5-dione is dissolved in 50 ml. of ethanol and 5 ml. of the triethyl ester of orthoformic acid. The mixture is mixed with 0.75 ml. of a 0.5% ethanolic solution of p-toluenesulfonic acid and allowed to stand for 150 minutes at room temperature.

After working up the reaction mixture as described in Example 1, 5.3 g. of (±)-7aβ-methyl-4-(3′,3′-diethoxybutyl)-5,6,7,7a-tetrahydroindan-1,5-dione is produced as a colorless oil; $\epsilon_{249}$=11,100; IR bands at 5.78μ and 6.03μ.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Bicycloalkane derivatives of the formula

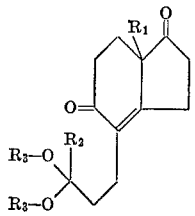

wherein $R_1$, $R_2$, and $R_3$ are each alkyl of 1–6 carbon atoms.

2. A compound of Claim 1 wherein $R_1$ is methyl or ethyl.

3. A compound of Claim 1 (±)-7aβ-methyl-4-(3′,3′-dimethoxybutyl)-5,6,7,7a-tetrahydroindan-1,5-dione.

4. A compound of Claim 1, (+)-7aβ-methyl-4-(3′,3′-dimethoxybutyl)-5,6,7,7a-tetrahydoindan-1,5-dione.

5. A compound of Claim 1 (+)-7aβ-ethyl-4-(3′,3′-dimethoxybutyl)-5,6,7,7a-tetrahydroindan-1,5-dione.

6. A compound of Claim 1, (±)-7aβ-methyl-4-(3′,3′-diethoxybutyl)-5,6,7,7a-tetrahydroindan-1,5-dione.

7. A process for preparing a compound of Claim 1 which comprises selectively ketalizing with an alkanol of 1–6 carbon atoms at about −20 to +80° C. and the presence of a catalytic amount of an acidic catalyst, a compound of the formula

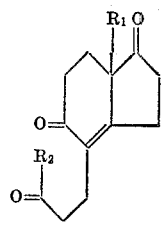

wherein $R_1$ and $R_2$ are each alkyl of 1–6 carbon atoms.

8. A process according to Claim 7, wherein the ketalization is conducted at about room temperature in the presence of a water-binding agent.

9. A process according to Claim 8, wherein said catalyst is a mineral acid, Lewis acid, sulfonic acid, or phenol.

10. A process according to Claim 8 wherein the alkanol is methanol or ethanol.

11. A process according to Claim 8 which comprises effecting the ketalization in the presence as a water-binding agent of a trialkyl ester of orthoformic acid.

References Cited

Kirk-Othmer, "Ency. of Chem. Tech.," second ed., vol. 12, pp. 120–1 (1968).

Saucy, "C.A.," 71, pp. 81178–9 (1969).

Fedorova et al. "CA.," vol. 69, pp. 3062–3 (1968).

LEON ZITVER, Primary Examiner

N. MORGENSTERN, Assistant Examiner

U.S. Cl. X.R.

260—586 H